US008533551B2

(12) United States Patent
Abudi et al.

(10) Patent No.: US 8,533,551 B2
(45) Date of Patent: Sep. 10, 2013

(54) AUDIO ERROR DETECTION AND PROCESSING

(75) Inventors: Itsik Abudi, Givat Shmuel (IL); Roy Oren, Magshimim (IL)

(73) Assignee: Siano Mobile Silicon Ltd., Kfar-Netter (IL)

( * ) Notice: Subject to any disclaimer, the term of this patent is extended or adjusted under 35 U.S.C. 154(b) by 812 days.

(21) Appl. No.: 12/451,741

(22) PCT Filed: May 30, 2007

(86) PCT No.: PCT/IL2007/000656

§ 371 (c)(1), (2), (4) Date: Apr. 21, 2010

(87) PCT Pub. No.: WO2008/146271

PCT Pub. Date: Dec. 4, 2008

(65) Prior Publication Data

US 2010/0205516 A1 Aug. 12, 2010

(51) Int. Cl.
*H04L 1/20* (2006.01)

(52) U.S. Cl.
USPC .......... 714/747

(58) Field of Classification Search
USPC .......... 714/747
See application file for complete search history.

(56) References Cited

U.S. PATENT DOCUMENTS

| | | | | | |
|---|---|---|---|---|---|
| 5,568,495 | A | * | 10/1996 | Laczko et al. | 714/798 |
| 5,633,880 | A | * | 5/1997 | Lokhoff | 714/747 |
| 5,706,396 | A | * | 1/1998 | Schroder et al. | 704/228 |
| 5,918,205 | A | * | 6/1999 | Dierke | 704/230 |
| 6,144,707 | A | * | 11/2000 | Yoshida et al. | 375/316 |
| 6,687,670 | B2 | * | 2/2004 | Sydanmaa et al. | 704/226 |
| 2004/0186735 | A1 | * | 9/2004 | Ferris et al. | 704/500 |

FOREIGN PATENT DOCUMENTS

JP 2004 356881 12/2004

OTHER PUBLICATIONS

International Search report for PCT/IL2007/000656 dated Mar. 19, 2008.

Wiese D: "Optimization of Error Detection and Concealment for ISO/MPEG/AUDIO CODECs Layer I and II". Preprints of papers presented at the AES convention, No. 3388, 1992, pp. 1-29, XP000996599.

* cited by examiner

*Primary Examiner* — Stephen M Baker

(74) *Attorney, Agent, or Firm* — Eitan, Mehulal & Sadot

(57) ABSTRACT

A method of processing a DAB audio stream, the method comprising: receiving a compressed and modulated DAB audio stream comprising a plurality of audio frames encoded with scale factors and a DAB-CRC error detection code for indicating errors in the scale factors; demodulating the DAB stream; and processing the demodulated and still compressed DAB stream responsive to the DAB-CRC of at least one audio frame of the plurality of audio frames; by determining a trend in values of scale factors and repairing or concealing the error in the scale factor responsive to the trend.

10 Claims, 4 Drawing Sheets

AUDIO ERROR DETECTION AND PROCESSING

CROSS-REFERENCE TO RELATED APPLICATIONS

The present application is a US National Phase of PCT Application No. PCT/IL2007/000656, filed on May 30, 2007, which claims benefit, the disclosure of it's entirety is incorporated herein by reference.

FIELD OF THE DISCLOSURE

The invention relates to detection and processing errors in digital audio streams.

BACKGROUND

Broadcasting of digital radio is gradually replacing old, analog broadcasting methods. Digital radio transmissions are transmissions of computer audio files over the air. The technology of digital audio broadcasting is referred to as "DAB".

Among the benefits of digital radio are better audio quality, better utilization of available transmission bandwidth and the ability to couple transmissions with additional data such as station identifiers and program information.

However, digital radio receivers, like the analog receivers that preceded them, often suffer from reception problems such as fading, signal distortion and/or periodic complete signal loss. These problems can be the result of, for example, electromagnetic interference, relatively large distance of receivers from a transmitter that transmits signals they receive, or faulty antenna adjustment.

Various standards provide methods for detection and "concealment" of some of the errors that occur in a transmitted digital audio signal. Among these standards are the European ETSI 300 401 v1.4.1 standard, the United States NRSC-5-A standard and the Japanese ISDB-T standard. For convenience of presentation, error detection is described herein according to the European ETSI 300 401 v1.4.1 standard (hereinafter referred to as the "DAB standard"), the disclosure of which is incorporated herein by reference.

The DAB standard introduces guidelines for broadcasting MPEG-1 Layer 2, digital audio segments, hereinafter referred to as "MP2". MP2 is a type of computer digital audio stream compression, defined by international standard ISO/IEC 11172-3 (hereinafter referred to as the "MP2 standard"), the disclosure of which is incorporated herein by reference. The DAB standard is based largely on the MP2 standard, although it includes multiple modifications and additions to MP2, aimed at suiting MP2 for wireless transmission.

According to the DAB standard, DAB streams include a plurality of data segments, referred to as "frames". Each frame contains data sufficient to define a different period of a plurality of sequential periods of playable sound. The length of a period of playable sound defined by data in a DAB frame depends on a sampling rate at which the playable sound is sampled to generate the data. Commonly, frames provide data for generating fractions of a second of playable sound, and the duration of playable sound encoded in a frame is inversely proportional to the data-sampling rate. For example, DAB frames characterized by sampling rates of 24 KHz or 48 KHz generally provide 48 or 24 milliseconds ("ms") of playable sound, respectively.

Reference is now made to FIG. 1, which is a schematic illustration of a DAB frame 100, according to the DAB standard. DAB frame 100 optionally includes a sound sample portion 112 that encodes the playable sound, and multiple administrative portions.

Sound sample portion 112 generally includes 1152 frequency sub-band samples. Reference is now made to FIG. 2, which shows a more detailed schematic illustration of sound sample portion 112. Sound sample portion 112 is partitioned into 36 sound period samples 202, numbered 0 to 35, each comprising frequency domain amplitudes for 32 frequency sub-bands 204, numbered 0 to 31, for a total of 1152 frequency sub-band samples. Sound period samples 202 are divided into three temporal, sequential segments of 12 sound period samples, T-Segment A 206, T-Segment B 208 and T-Segment C 210. Samples for frequency sub-bands that are usually hardly noticeable by the human ear, such as, for example, very low frequency sub-bands denoted by the numerals 29, 30 and 31 in frequency sub-bands 204, are often dropped during encoding to save space and produce a smaller audio file. Therefore, DAB frames are usually configured to comprise less than 32 frequency sub-bands and typically comprise 27 or 29 frequency sub-bands and frequently not all of the sub-bands in these frames are used.

Referring to FIG. 1, the administrative portions of DAB frame 100 optionally include a header portion 102, a first error checking portion 104 referred to as "MP2-CRC" 104, an allocation table 106, a scale factor selection information portion 108, referred to as "SCFSI" 108, a volume scale factor portion 110, a bit stuffing portion 116, referred to as "stuff" 116, an X-PAD portion 118, a second error checking portion 120 referred to as "DAB-CRC" 120 and an F-PAD portion 130.

Header 102 marks the beginning of DAB frame 100 and includes information identifying DAB frame 100 as a DAB frame and defining various housekeeping parameters. SCFSI 108 includes information defining which scale factor of scale factor portion 110 is associated with each T-Segment. Allocation table 106 defines the bit arrangement and a number of bits allocated for each sub-band 204 in sound sample portion 112. MP2-CRC 104 generally includes information, referred to in the DAB standard as a "CRC-word", calculated responsive to the bits (also referred to as the "protected bits") in header 102, allocation table 106 and/or SCFSI 108 and is usable to determine if an error occurs in these portions of DAB frame 100. Calculation of the CRC-word is performed, according to the DAB standard, using a method referred to as "CRC-16". CRC and related error detection and correction coding are described in Todd K. Moon, *Error Correction Coding: Mathematical Methods and Algorithms* (2005), the disclosure of which is incorporated herein by reference. MP2-CRC 104 does not enable determining an exact location and nature of an error, but only indicates possible occurrence of an error somewhere in header 102, allocation table 106 and/or SCFSI 108. For convenience of presentation, a CRC-word encoded at the time of generating a frame, such as MP2 frame 100, is referred to as an "original CRC-word".

During the transmission of an audio stream, errors may occur in header 102, allocation table 106, SCFSI 108 and/or in the original CRC-word in MP2-CRC 104. As a result, a CRC-word, hereinafter a "received CRC-word", included in MP2-CRC 104 when DAB frame 100 is received by a receiver, may be different than the original CRC-word and/or may not properly correspond to data in header 102, allocation table 106, and/or SCFSI 108. Presence of errors in header 102, allocation table 106 and/or SCFSI 108 of a received frame 100 are often determined by calculating a new "test CRC-word" based upon bits of header 102, allocation table 106 and SCFSI 108 in the received frame, and comparing this test CRC-word to the received CRC-word. Should the test CRC-word be identical to the received CRC-word, it is most likely that the received CRC-word and the protected bits of header 102, allocation table 106 and SCFSI 108 are error-free.

According to the MP2 standard, if an error in header 102, allocation table 106 and/or SCFSI 108 is detected, the entire DAB frame 100 is either muted or replaced with a previous, error-free, frame. Muting the entire DAB frame 100 may be performed, for example, by setting all the scale factors of volume scale factor portion 110, described in detail in the following paragraphs, to a lowest volume level.

Scale factor portion 110 includes multiple 6 bit long binary numbers indicating volumes at which playable sound encoded in sound samples portion 112 should be played. Each scale factor includes binary values on a 63-level scale, stalling with "000000" and ending with "111110", wherein "000000" is the highest volume level and "111110" is the lowest. The binary values represent an exponential volume scale, in which each volume level is ($\sqrt[3]{\sqrt{2}}$) times higher than an immediately preceding one. Therefore, the highest volume level (000000) in the scale is approximately 1.666 million times higher than the lowest volume level (111110).

Scale factor portion 110 includes up to 96 scale factors. The actual number of scale factors is responsive to a degree of volume variance in playable sound encoded in DAB frame 100, and to the number of frequency sub-bands in the DAB frame. Generally, more scale factors are used as volume variance in the playable sound increases, and as more frequency sub-bands exist.

Each scale factor defines relative volumes for T-Segments 206, 208 and 210 (T-Segments A, B and C) of a frequency sub-band, depending on the volume pattern along the T-Segments of the frequency sub-band. The MP2 standard defines four T-Segment volume patterns that may be associated with scale factors.

1. In one volume pattern, the volumes of T-Segment A 206, T-Segment B 208 and T-Segment C 210 are identical. In this case, one scale factor defines the volumes of the three T-Segments.

2. In a second volume pattern, the volumes of T-Segment A 206 and T-Segment B 208 are identical, while the volume of T-Segment C 210 is different. In this case, one scale factor defines the volume of both T-Segment A 206 and T-Segment B 208, and one scale factor defines the volume of T-Segment C 210.

3. In a third volume pattern, the volumes of T-Segment B 208 and T-Segment C 210 are identical, while the volume of T-Segment A 206 is different. In this case, one scale factor defines the volume of both T-Segment B 208 and T-Segment C 210, and one scale factor defines the volume of T-Segment A 206.

4. In a fourth volume pattern, the volumes of T-Segment A 206, T-Segment B 208 and T-Segment C 210 are different. In this case, a different scale factor defines the volume of each of the three T-Segments.

Stuff 116 comprises filler bits that fill up space reserved for data that is used in MP2 frames but generally not in standard DAB frames.

X-PAD 118 and F-PAD 130 include program-associated data ("PAD"), such as information about the broadcasting radio station, the current radio program and/or the song currently playing. PAD is stored in F-PAD 130, and if the PAD exceeds the size of F-PAD 130, X-PAD 118 is utilized for storing the remainder of the PAD, up to the size reserved for X-PAD 118.

DAB-CRC 120 includes two or four CRC-words, calculated using CRC-16, responsive to the three most significant bits ("MSb") of each of the scale factors of scale factor portion 110. DAB-CRC 120 contains two CRC-words if the sampling rate of the DAB stream is 48 KHz and its bitrate is less than 56 Kbps (kilobits per second). Otherwise, DAB-CRC 120 contains four CRC-words. For convenience of discussion, the following description assumes a DAB-CRC having four CRC-words, denoted DAB-CRC1 122, DAB-CRC2 124, DAB-CRC3 126 and DAB-CRC4 128.

DAB-CRC1 122 protects the scale factors of frequency sub-bands 204 numbered 0-3 (FIG. 2), DAB-CRC2 124 protects the scale factors of frequency sub-bands 204 numbered 4-7, DAB-CRC3 126 protects the scale factors of frequency sub-bands 204 numbered 8-15 and DAB-CRC4 128 protects the scale factors of frequency sub-bands 204 numbered 16-26. An error in a scale factor in a DAB stream frame can generate noticeable and annoying noise in sound played responsive to the DAB stream and audio players optimized for playing DAB streams generally provide for concealing and/or repairing such errors.

However, there exists a relatively large inventory of integrated circuits, off the shelf ASICS and software, hereinafter referred to as "audio decoders", configured to decode and play audio streams, such as MP2 and/or MP3 (more compressed audio stream standard) that are used, or may be used, to play DAB streams but are not optimized to play DAB streams. These audio decoders are blind to data in DAB-CRC 120 and as a result cannot and do not utilize data in DAB-CRC for detecting and concealing or repairing scale factor errors indicated by DAB-CRC.

SUMMARY

An aspect of some embodiments of the invention, relates to providing a method for enabling an audio decoder not optimized to decode and play DAB audio streams, to play DAB audio streams corrected, optionally by repair and/or concealment, for scale factor errors indicated by DAB-CRC.

The word "correct" and its inflections when associated with errors, such as scale factor errors, indicated by a CRC code in a DAB audio stream is used to indicate any processing, including repairing and/or concealing, in accordance with an embodiment of the invention, intended to reduce effects of errors on sound played responsive to the DAB stream. Processing to reduce effects of errors, includes repairing errors and/or concealing errors.

In an embodiment of the invention, a DAB stream to be played by an audio decoder is demodulated and the demodulated DAB stream, still compressed stream, is processed to correct for an error in a scale factor that may be indicated by a DAB-CRC-word in a given frame of the stream. The corrected audio stream is then input to the audio decoder to be decoded and played.

An aspect of some embodiments of the invention, relates to providing a method for repairing an error in a scale factor of a given DAB frame of a compressed DAB audio stream indicated by a DAB-CRC-word in the frame.

In some embodiments of the invention, the scale factor is repaired by replacing the scale factor with a replacement scale factor determined responsive to a trend analysis of scale factors in two or more nearby received frames. Any of various methods known in the art, such as averaging, weighted averaging and curve fitting, may be used to determine a trend. Optionally, a nearby frame is a nearest preceding or succeeding frame in which a DAB-CRC portion of the frame does not indicate an error in the frame scale factor. Optionally, the replacement scale factor is constrained so that after being used to repair the scale factor in the given frame, a test CRC-word generated for the repaired frame is equal to the received DAB-CRC-word comprised in the frame. In some embodiments of the invention, the replacement scale factor is adjusted so that it indicates a volume lower by one level than the scale factor provided by the trend analysis. For convenience of presentation, hereinafter a trend analysis of scale factors may be referred to as a "volume trend analysis".

In some embodiments of the invention, a scale factor that is indicated as being erroneous is corrected by concealing the error. Optionally, concealing the error comprises replacing the scale factor with an error-free scale factor of a nearby frame. Optionally, concealment comprises setting the erroneous scale factor to a lowest volume level.

An aspect of some embodiments of the invention relates to providing a method for correcting an error indicated by an MP2-CRC portion in a given DAB frame of a DAB stream to be decoded by an audio decoder and played.

In an embodiment of the invention, the DAB stream is demodulated and the demodulated DAB stream processed to correct for a possible error in the header of the given frame that might have given rise to the error indication provided by the MP2-CRC portion. Optionally, the frame header is checked to see if it differs from headers of other frames in the stream. In general, headers of frames in a same DAB stream are identical. In accordance with an embodiment of the invention, if the given frame has a header different from the headers of other frames, the header of the given frame is assumed to be in error. A plurality of frames in the stream are polled to determine by "vote" a "correct" header and the erroneous header replaced by the correct header. Optionally, the polled frames are nearby frames, frames immediately preceding or succeeding the given frame.

An aspect of some embodiments of the invention, relates to providing a method for repairing an error in an allocation table and/or SCFSI of a given received DAB frame detected responsive to the MP2-CRC-word of the frame.

In an embodiment of the invention, the demodulated and still compressed DAB stream is processed to correct for a possible error in the allocation table and/or SCFSI of the given frame that might have given rise to the error indication provided by the MP2-CRC portion.

In an embodiment of the invention, the allocation table and/or SCFSI are repaired by replacing a value in the allocation table and/or SCFSI by a value that is determined responsive to a trend analysis of values in allocation tables and/or SCFSIs of two or more nearby received frames. Optionally, the values are constrained so that after being used to repair the allocation table and/or SCFSI of the given frame, a test CRC-word generated for the repaired frame is equal to a received CRC-word comprised in the frame. Optionally, a nearby received frame is a nearest preceding or succeeding frame in which an MP2-CRC does not indicate errors.

There is therefore provided in accordance with an embodiment of the invention, a method of processing a DAB audio stream, the method comprising: receiving a compressed and modulated DAB audio stream comprising a plurality of audio frames encoded with scale factors and a DAB-CRC error detection code for indicating errors in the scale factors; demodulating the DAB stream; and processing the demodulated and still compressed DAB stream responsive to the DAB-CRC of at least one audio frame of the plurality of audio frames. Optionally, receiving a DAB stream comprises receiving a wirelessly transmitted DAB stream. Optionally, receiving a DAB stream comprises receiving a DAB stream transmitted by wire.

In some embodiments of the invention, processing the DAB audio stream comprises transmitting the processed, compressed DAB stream to an audio decoder for decoding for playing.

In some embodiments of the invention, processing the demodulated DAB stream comprises repairing an error in a scale factor of the at least one audio frame. Optionally, repairing an error in a scale factor comprises determining a trend in values of scale factors in a plurality of frames and repairing the error in the scale factor of the at least one audio frame responsive to the trend.

In some embodiments of the invention, processing the demodulated DAB stream comprises concealing an error in a scale factor of the at least one audio frame. Optionally, concealing an error comprises replacing a scale factor with a corresponding scale factor of a frame nearby to the at least one audio frame. Additionally or alternatively, concealing an error optionally comprises reducing a scale factor to a lower volume scale factor.

In some embodiments of the invention, the DAB frames comprise a header, an allocation table and a scale factor selection information portion (SCFSI) and are encoded with an MP2-CRC error detection code for indicating an error in the header, allocation table and/or the SCFSI of at the least one audio frame. Optionally, processing the demodulated DAB stream comprises using the error detection code determining if an error is present in the header of the at least one audio frame. Optionally, determining whether an error is present in the header of the at least one audio frame comprises polling headers of a plurality of frames to determine a correct header and comparing the header of the at least one audio frame to the correct header. Optionally, the method comprises replacing the header of the at least one audio frame with the correct header.

There is further provided in accordance with an embodiment of the invention, a receiver for receiving a compressed and modulated DAB audio stream and processing the stream for decoding on an audio decoder, the receiver comprising: a demodulator that demodulates a received DAB audio stream, the DAB stream comprising audio frames encoded with scale factors and a DAB-CRC error detection code for indicating errors in the scale factors; processing circuitry that receives the demodulated and still compressed DAB stream and processes the demodulated DAB stream responsive to the DAB-CRC of at least one audio frame; and an output port for transmitting the demodulated and processed DAB stream to an the audio decoder. Optionally, the processing circuitry is configured to repair an error in a scale factor of the at least one audio frame. Optionally, the processing circuitry is configured to determine a trend in values of scale factors in a plurality of frames. Optionally, the processing circuitry is configured to repair the error in the scale factor of the at least one audio frame responsive to the trend.

In some embodiments of the invention, the processing circuitry is configured to conceal an error in a scale factor of the at least one audio frame. Optionally, the processing circuitry is configured to conceal the error by replacing the scale factor with a corresponding scale factor of an audio frame nearby to the at least one audio frame. Additionally or alternatively, the processing circuitry is optionally configured to conceal the error by reducing the scale factor to a lower volume scale factor.

There is further provided in accordance with an embodiment of the invention, a computer readable medium containing a set of instructions for programming a processor to process a demodulated and compressed DAB stream comprising a plurality of audio frames encoded with a DAB-CRC error detection code responsive to the DAB-CRC of at least one audio frame of the plurality of audio frames.

There is further provided in accordance with an embodiment of the invention, a signal set containing instructions for programming a processor to process a demodulated and compressed DAB stream comprising a plurality of audio frames encoded with a DAB-CRC error detection code responsive to the DAB-CRC of at least one audio frame of the plurality of audio frames.

BRIEF DESCRIPTION OF THE FIGURES

Examples illustrative of embodiments of the invention are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION OF EMBODIMENTS

Figure 3A:
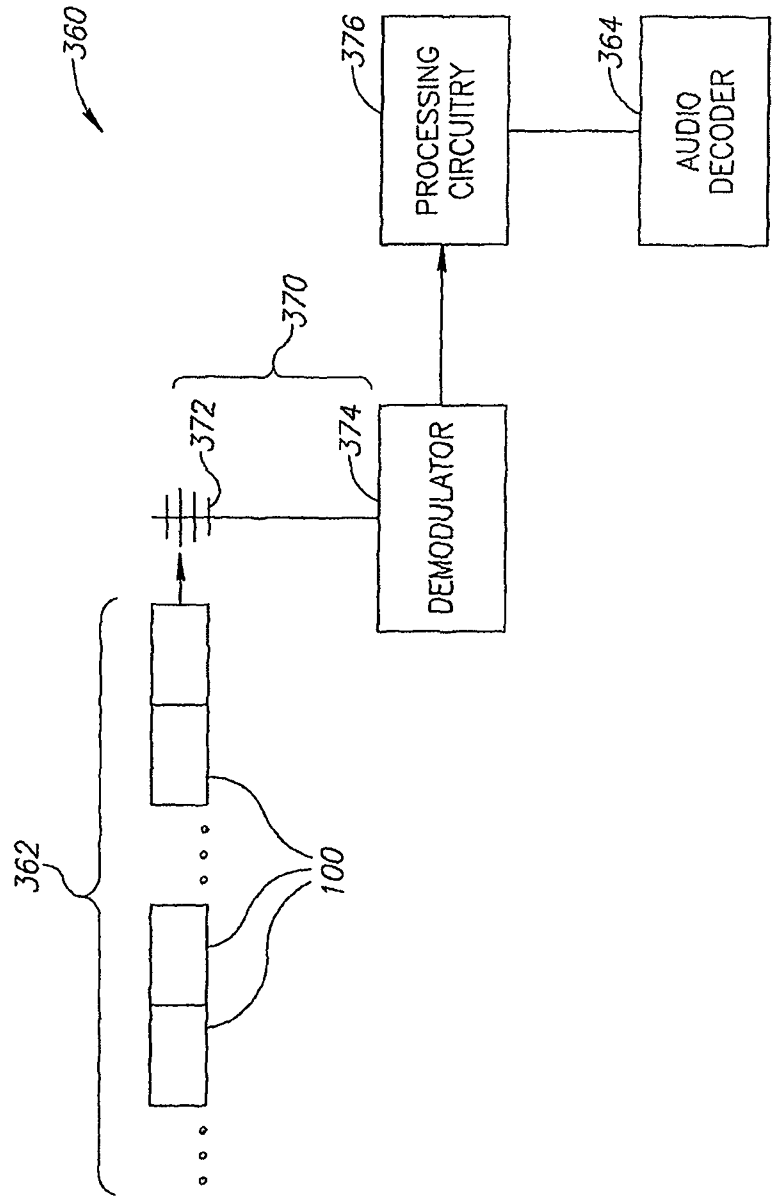
FIG. 3A schematically shows a configuration for playing a DAB audio stream transmitted over the air and using an MP2 player that is not optimized for playing DAB audio streams to play the audio stream, in accordance with an embodiment of the invention.

FIG. 3A schematically shows a configuration 360 for playing a DAB audio stream 362 transmitted over the air and using an audio decoder 364 that is not optimized for playing DAB audio streams to decode the DAB stream for playing in accordance with an embodiment of the invention. DAB audio stream 362 is schematically represented by a plurality of contiguous DAB frames 100 similar to DAB frame 100 shown in FIG. 1.

Configuration 360 optionally comprises a DAB receiver 370 in accordance with an embodiment of the invention, for receiving and processing DAB streams similar to DAB stream 362. DAB receiver 370 optionally comprises an antenna 372 for receiving DAB audio stream 362 and a demodulator 374 that demodulates the received DAB stream. In accordance with an embodiment of the invention, configuration 360 comprises a processing circuitry 376 that receives DAB frames 100 in audio stream 362 from demodulator 374 after they are demodulated by the demodulator. Processor 376 processes the demodulated and still compressed data in the frames responsive to data in DAB-CRC portion 120 of the frames to reduce effects of scale factor errors on quality of sound played responsive to DAB stream 362. Processing circuitry 376 optionally processes demodulated frames using a method 300 (FIG. 3B, discussed below) in accordance with an embodiment of the invention. Following processing by processing circuitry 376, receiver 370 transmits processed frames to audio decoder 364 for decoding and playing.

Figure 3B:
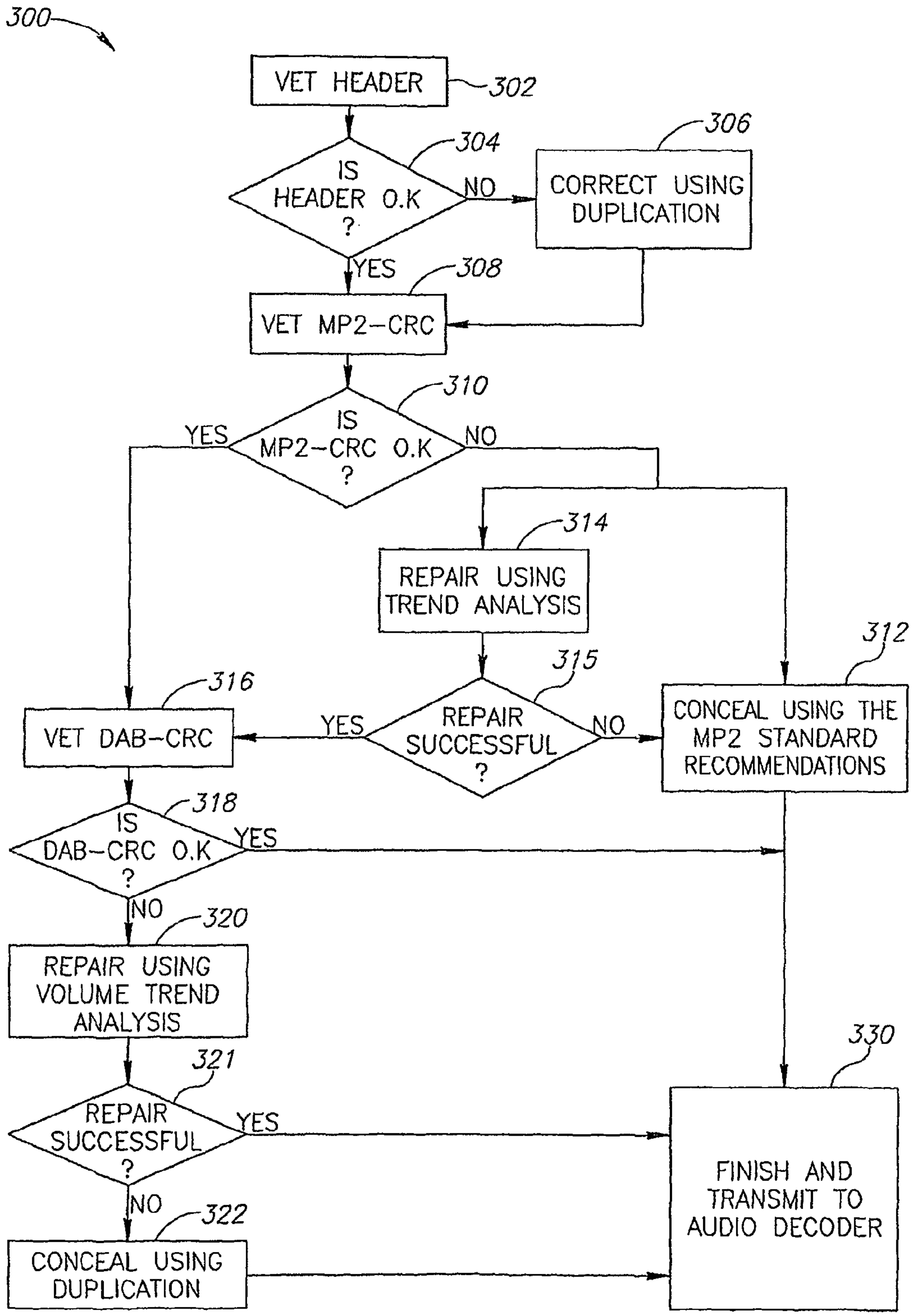
FIG. 3B shows a flowchart of an error-handling method used by the configuration shown in FIG. 3A, in accordance with an embodiment of the invention.

Reference is now made to FIG. 3B, which shows a flowchart of method 300 for correcting errors in a given DAB frame 100 comprised in DAB audio stream 362 (FIG. 3A), according to an embodiment of the invention.

In a block 302, of method 300 header 102 (FIG. 1) of the received DAB frame is vetted for errors. Vetting of header 102 is performed by comparing it to other DAB frames of the same DAB stream. Since headers of frames in a same DAB stream are generally identical, errors in header 102 can be determined by identifying a "correct header" in other frames of the DAB stream, and comparing header 102 to this correct header. Optionally, a correct header is identified by examining headers of an uneven integer number, equal to or larger than 3, of other frames. Optionally, the other frames are nearby frames, frames immediately preceding and/or succeeding DAB frame 100.

A "democratic voting" scheme is optionally employed, whereby a majority of the other frames examined, having identical headers, are deemed to have correct headers. The identified correct header is then compared to header 102. In accordance with an embodiment of the invention, in a decision block 304, it is determined whether header 102 contains errors or not. If the correct header and header 102 are dissimilar, it is determined that header 102 contains errors. If the correct header and header 102 are identical, it is determined that header 102 is error-free. In a block 306, if header 102 is determined to include errors, it is corrected, according to an embodiment of the invention, by replacing its contents with contents of the correct header. The inventors determined that vetting, and if necessary correcting, header 102 of the received DAB frame prior to checking the frame's MP2-CRC 104 (which is optionally performed in a block 308), can be advantageous in preventing misinterpretation of the data in MP2-CRC 104 of frame 100.

In a block 308, header 102, allocation table 106 and SCFSI 108 are vetted for errors using MP2-CRC 104. If header 102 was previously determined to be error-free in block 304, or corrected in block 306, then errors indicated using MP2-CRC 104 are assumed not to be located in header 102, but rather in allocation table 106, in SCFSI 108 and/or in the received CRC-word of MP2-CRC 104. In a decision block 310, it is determined whether MP2-CRC 104 indicates errors or not.

In an embodiment of the invention, if in block 310 MP2-CRC 104 is determined to indicate an error, method 300 is programmed to proceed either to a step 312 or to a step 314. The choice of whether to proceed to block 312 or 314 is optionally determined by customer preference. In block 312, errors indicated using MP2-CRC 104 are corrected by concealment using recommendations of the MP2 standard. According to the MP2 standard, errors indicated by MP2-CRC 104 often cause a severe interpretation problem of the affected frame. Therefore, the MP2 standard recommends, either silencing the entire frame or replacing it with a previous, error-free, DAB frame. If errors are corrected using the MP2 standard recommendations, method 300 proceeds to a block 330, ends error correction processing of the given received DAB frame, and the corrected frame is transmitted to the audio decoder 364 (FIG. 3A).

In accordance with an embodiment of the invention, in block 314, errors indicated using MP2-CRC 104 are repaired using a "trend analysis" method. A statistical study done on DAB streams by the inventors shows that error-free allocation tables of nearby frames usually form a trend, created by the number of bits allocated for each sub-band of these frames. That is, the inventors have found that a number of bits allocated for each sub-band usually changes gradually along consecutive frames. The inventors have also determined that error-free SCFSI portions also usually exhibit a trend, created by the number of scale factors associated with each sub-band of these frames. Therefore, in accordance with an embodiment of the invention, errors indicated using MP2-CRC 104 are repaired by replacing values of allocation table 106 and/or SCFSI 108 with values that fit an analyzed trend, and produce a test CRC-word that is equal to the received CRC-word.

In an embodiment of the invention, the trend analysis method of block 314 includes analyzing a trend in error-free allocation tables and/or SCFSI portions of nearby frames, locating values in allocation table 106 and/or SCFSI 108 that do not fit the analyzed trend, and determining alternative values that fit the trend (hereinafter "trend values"). Then, a test CRC-word is calculated based on the trend values, header 102, and the remainder of allocation table 106 and/or SCFSI 108, and the test CRC-word is compared to the received CRC-word of MP2-CRC 104. If the test CRC-word and the received CRC-word are identical, the trend values are used to replace the values of allocation table 106 and/or SCFSI 108 that do not fit the analyzed trend. If the test CRC-word and the received CRC-word are different, the trend values are adjusted repeatedly, a test CRC-word is calculated after each adjustment and compared to the received CRC-word. Optionally, a first adjustment is performed by increasing or decreasing the trend values by 1, a second adjustment is performed by respectively decreasing or increasing the trend values by 1, a third adjustment is performed by increasing or decreasing the trend values by 2, a fourth adjustment is performed by respectively decreasing or increasing the trend values by 2, and so forth.

Figure 1:
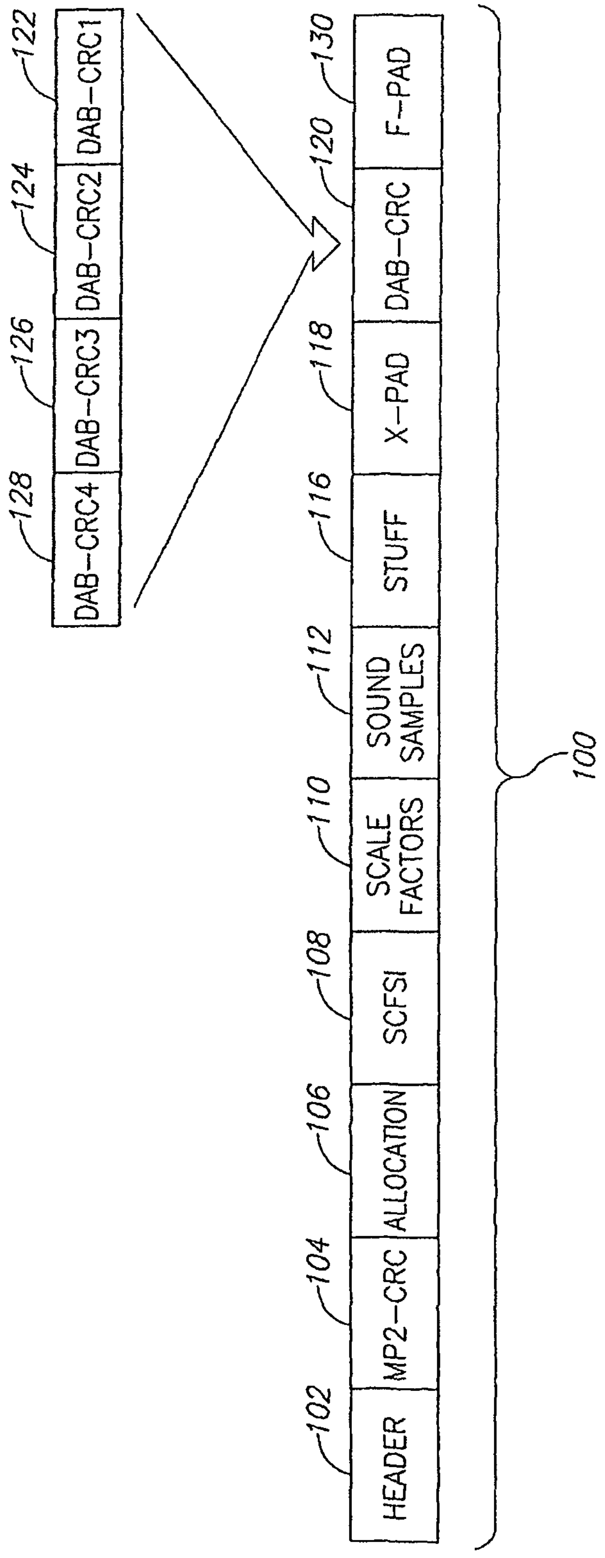
FIG.1 PRIOR ART
FIG. 1 schematically shows a DAB frame, in accordance with prior art.
Figure 2:
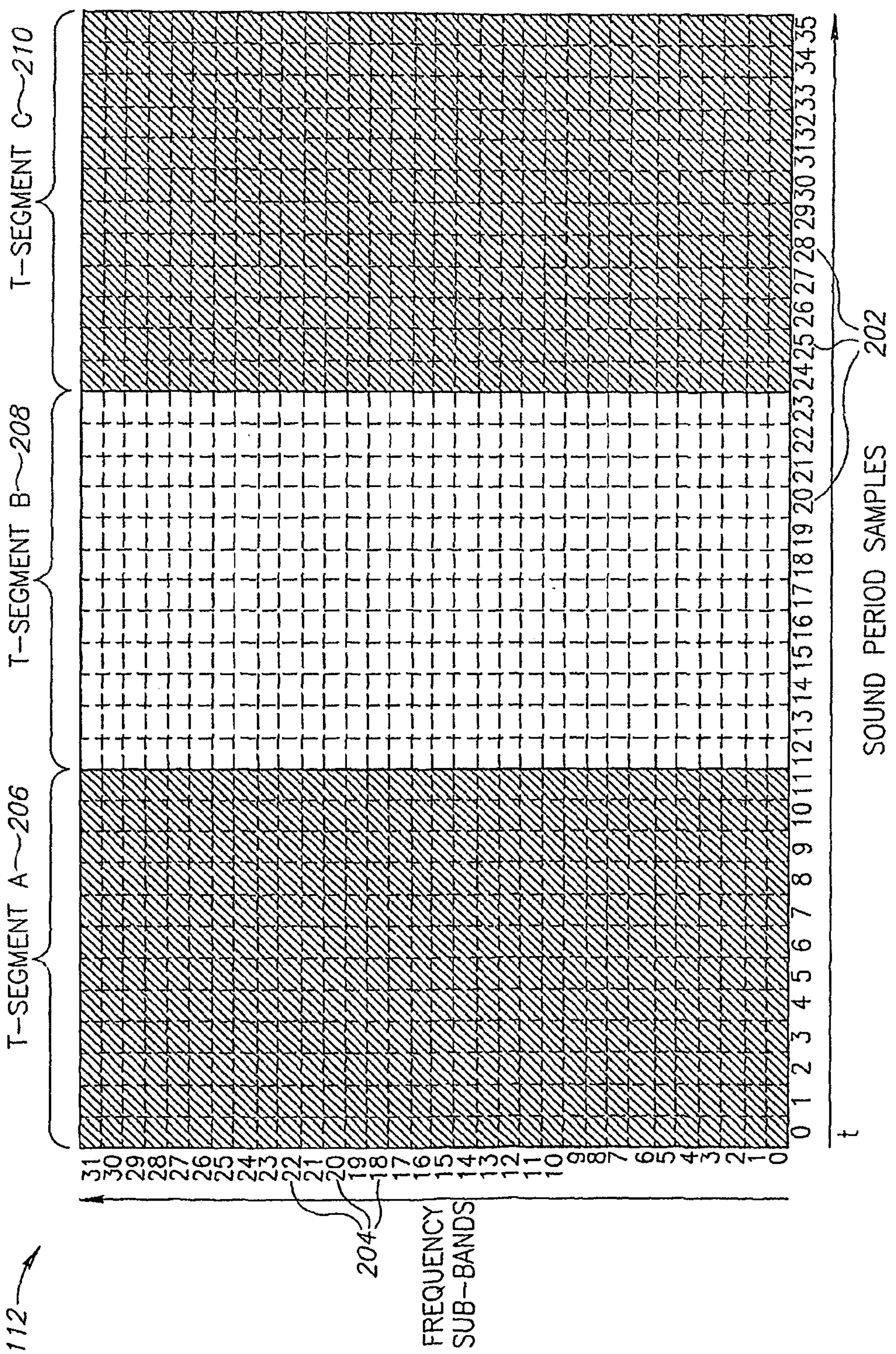
FIG. 2 PRIOR ART
FIG. 2 schematically shows a sound sample portion of a DAB frame, in accordance with prior art.

The adjustment process continues until either a test CRC-word that matches the received CRC-word is found or a predetermined maximum number of attempts at adjusting the trend values are made. If a matching test CRC-word is not found in a number of attempts less than or equal to the maximum number of attempts the trend analysis is deemed unsuccessful in a block 315. The trend repair is abandoned and method 300 proceeds to block 312. In block 312 method 300 corrects the frame using MP2 standard recommendations and either silences the entire frame or replaces it with a previous, error-free, DAB frame and proceeds to block 330. In block 330, the method ends error correction processing and transmits the silenced or replaced frame to audio decoder 364. If on the other hand a test CRC-word that matches the received CRC-word is found in less than the maximum number of attempts, the trend analysis repair is deemed successful in block 315 and the adjusted trend values are used to replace the erroneous values of allocation table 106 and/or SCFSI 108. Optionally, the maximum number of attempts at adjusting the trend values is equal to about 10% of a number of different CRC values defined by a CRC-word of MP2-CRC 104 (FIG. 1). Optionally, the maximum number is equal to about 5%. Since a CRC-word comprises eight bits, the number of different CRC-words is equal to 256 and by way of example, 5% of the possible different CRC-words is equal to about 13. Therefore, in accordance with an embodiment of the invention, if a matching test CRC-word is not found by an attempt at which about 13 different unsuccessful test CRC-words have been generated the trend analysis is deemed to be unsuccessful.

If it is determined in decision block 315, that the trend analysis repair is successful, or if it is determined, in decision block 310, that MP2-CRC 104 does not indicate errors, method 300 proceeds to a block 316 and vets scale factor portion 110 using DAB-CRC 120. Responsive to the vetting procedure in block 316, in a decision block 318, it is determined whether DAB-CRC 120 indicates errors in scale factor portion 110 or not. If it is determined that DAB-CRC 120 does not indicate errors in scale factor portion 110, error-handling method 300 is optionally finished, and proceeds to block 330.

If it is determined in decision block 318 that DAB-CRC 120 indicates errors in scale factor portion 110, errors are optionally repaired, in a block 320, using a "volume trend analysis" method, in accordance with an embodiment of the invention. A statistical study done on DAB streams by the inventors, shows that error-free scale factors of nearby frames usually indicate volumes that exhibit relatively well defined trends and that these trends can be used to repair errors in scale factor portions 110 of DAB frames. Repairing errors in scale factor portion 100, in accordance with an embodiment of the invention, can be advantageous in improving fidelity of sound played responsive to a DAB audio stream and removing disturbing aberrations in the played sound. For example, the inventors have determined that sporadic, relatively sudden and annoying bursts of loud noise often heard when a DAB stream is played, are usually caused by scale factors that encode erroneous, discontinuous and usually relatively large changes in volume.

The volume trend analysis method in block 320 optionally includes analyzing a volume trend in error-free scale factor portions of nearby frames, locating "aberrant" values in scale factor portion 110 of the given frame that do not fit the analyzed volume trend, and replacing the aberrant values with "trend" values.

Optionally, aberrant values in scale factor portion 110 are replaced with "lowered" trend values that represent lower volumes than the originally determined trend values. Optionally, a trend value is lowered to provide a lowered trend value, by reducing the trend value's most significant bit by 1. For example, if a trend value in scale factor portion 110 is equal to "000000", an aberrant value that does not fit the analyzed volume trend is replaced with "100000", Optionally, aberrant values in scale factor portion 110 that do not fit the analyzed trend are replaced, using an "extended volume trend analysis" method, hereinafter "EVTA", with values that both approximately fit the volume trend and cause a test CRC-word to be equal to the received CRC-word of MP2-CRC 104.

EVTA includes calculating a test CRC-word based on the trend values analyzed using the trend analysis method, and comparing that test CRC-word to the corresponding received CRC-word of DAB-CRC1 122, DAB-CRC2 124, DAB-CRC3 126, or DAB-CRC4 128. If the test CRC-word and the received CRC-word are identical, the trend values are used to replace the values in scale factor portion 110 that do not fit the analyzed volume trend. If the test CRC-word and the received CRC-word are different, the trend values are optionally adjusted again and another test CRC-word generated and compared to the received CRC-word. Optionally, adjustments to volume trend values in block 320 are made similarly to adjustments discussed above that are made for trend values in block 314. The adjustment process continues until either a test CRC-word that matches the received CRC-word is found or a predetermined maximum number of attempts at adjusting the trend values are made.

If a matching test CRC-word is found in a number of attempts less than or equal to the maximum number of attempts, the volume trend analysis EVTA is deemed successful in a block 321 and the adjusted trend values are used to replace the aberrant values of scale factor portion 110. Error-handling method 300 proceeds to block 330, ends error correction and transfers the frame to the audio decoder, in accordance with an embodiment of the invention If on the other hand, a match is not found in a number of attempts less than or equal to the maximum number of attempts, the EVTA repair is deemed unsuccessful in block 321 and method 300 optionally proceeds to a block 322. In block 322, errors are optionally concealed using a duplication method whereby scale factors indicated as erroneous by a CRC-word in received DAB-CRC 120, are replaced with corresponding error-free scale factors of a nearby frame. Optionally, the nearby frame used for each sub-band is a temporally adjacent frame having a lowest corresponding scale factor. By way of example, if the received CRC-word of DAB-CRC1 122 (FIG. 1) indicates errors, scale factors that define the volume of sub-bands 0-3 are replaced with scale factors of an adjacent frame, that define the volume of sub-bands 0-3 of the adjacent frame. Optionally, the adjacent frame for each sub-band 0-3 is an adjacent frame having lowest values for the scale factors of the sub-band.

In some embodiments of the invention, a scale factor protected by a given received CRC-word DAB-CRC1 122, DAB-CRC2 124, DAB-CRC3 126, and/or DAB-CRC4 128 that indicates the scale factor is erroneous is replaced in block 322 with a "replacement" scale factor that represents a lower volume than corresponding scale factors of a nearby frame, Optionally, the nearby frame is a temporally adjacent frame having a lowest volume corresponding scale factor. Optionally, the binary number represented by three most significant bits of the lower volume replacement scale factor is greater by 1 than the binary number represented by the three most significant bits of the corresponding scale factor. Following optional error correction in block 322, error-handling method 300 proceeds to block 330, ends error correction and transfers the frame to the audio decoder, in accordance with an embodiment of the invention.

Optionally, error-handling method 300 is performed continuously, on consecutive frames of a DAB stream. Optionally, error-handling method 300 is performed on selected one or more DAB frames. Error-handling method 300 is performed either on one DAB frame 100 at a time, or simultaneously on two or more DAB frames at a time.

Whereas in method 300 a DAB stream and a corrected DAB frame of the stream are indicated as being transmitted to an audio decoder, in some embodiment of the invention, the DAB stream and its corrected frames are stored in a memory for playing at a time later than a time at which the stream is received. In some embodiments of the invention, error-handling method 300 is used for detection and/or repair of errors in a DAB stream stored in a memory.

It is further noted that whereas method 300 is shown in FIG. 3A implemented by a processor separate from an audio decoder and a demodulator, the method may be incorporated in a single circuit comprising a demodulator and/or an audio decoder for processing demodulated DAB streams prior to their being decoded, in accordance with an embodiment of the invention.

In some embodiments of the invention, method 300 is encoded as a set of instructions recorded on a computer readable medium, such as a floppy disc, CD-ROM, of flash memory, suitable for use in programming a processor to carry out the method.

In some embodiments of the invention, method 300 is encoded in a signal set, such as an electrical, optical, and/or acoustical signal set, suitable for use in programming a processor to carry out the method.

It is noted that whereas the above description refers to a DAB standard similar to the European ETSI 300 401 v1.4.1 standard, "DAB" and the above description applies to all DAB and DAB-like standards for the transmission of audio streams.

In the description and claims of the application, each of the words "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize Only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. A method of processing a DAB audio stream, the method comprising:

receiving a compressed and modulated DAB audio stream comprising a plurality of audio frames, said frames comprising a header, an allocation table and a scale factor selection information portion (SCFSI) and wherein said frames are encoded with an MP2-CRC error detection code for indicating an error in said header, said allocation table and/or said SCFSI of at least one audio frame and wherein said frames are also encoded with scale factors and a DAB-CRC error detection code for indicating errors in said scale factors;

demodulating the DAB stream; and processing the demodulated and still compressed DAB stream responsive to the DAB-CRC of said at least one audio frame of the plurality of audio frames using said MP2-CRC error detection code and determining if an error is present in said header of said at least one audio frame by polling headers of a plurality of said frames to determine a correct header and comparing the header of said at least one audio frame to said correct header.

2. A method according to claim 1, wherein receiving a DAB stream comprises receiving a wirelessly transmitted DAB stream.

3. A method according to claim 1, wherein receiving a DAB stream comprises receiving a DAB stream transmitted by wire.

4. A method according to claim 1, wherein processing the DAB audio stream comprises transmitting the processed, compressed DAB stream to an audio decoder for decoding.

5. A method according to claim 1, further comprising replacing the header of the at least one audio frame with the correct header.

6. A method according to claim 1, wherein processing the demodulated DAB stream comprises repairing an error in a scale factor of the at least one audio frame.

7. A method according to claim 6, wherein repairing an error in a scale factor comprises determining a trend in values of scale factors in a plurality of frames and repairing the error in the scale factor of the at least one audio frame responsive to the trend.

8. A method according to claim 1, wherein processing the demodulated DAB stream comprises concealing an error in a scale factor of the at least one audio frame.

9. A method according to claim 8, wherein concealing an error comprises replacing a scale factor with a corresponding scale factor of a frame nearby to the at least one audio frame.

10. A method according to claim 8, wherein concealing an error comprises reducing a scale factor to a lower volume scale factor.

* * * * *